(No Model.)

F. SHUMAN.
MACHINE FOR EMBEDDING WIRE IN GLASS.

No. 574,458. Patented Jan. 5, 1897.

Witnesses:
Hamilton D. Turner
William N. Barr

Inventor,
Frank Shuman
by his Attorneys
Howson & Howson

UNITED STATES PATENT OFFICE.

FRANK SHUMAN, OF PHILADELPHIA, PENNSYLVANIA, ASSIGNOR TO THE WIRE GLASS COMPANY, OF SAME PLACE.

MACHINE FOR EMBEDDING WIRE IN GLASS.

SPECIFICATION forming part of Letters Patent No. 574,458, dated January 5, 1897.

Application filed November 23, 1893. Serial No. 491,694. (No model.)

*To all whom it may concern:*

Be it known that I, FRANK SHUMAN, a citizen of the United States, residing in Philadelphia, Pennsylvania, have invented certain Improvements in Machines for Embedding Wire in Glass, of which the following is a specification.

The object of my invention is to construct apparatus for carrying out the process set forth in the application for patent filed by me October 20, 1893, Serial No. 488,675.

Figure 1:
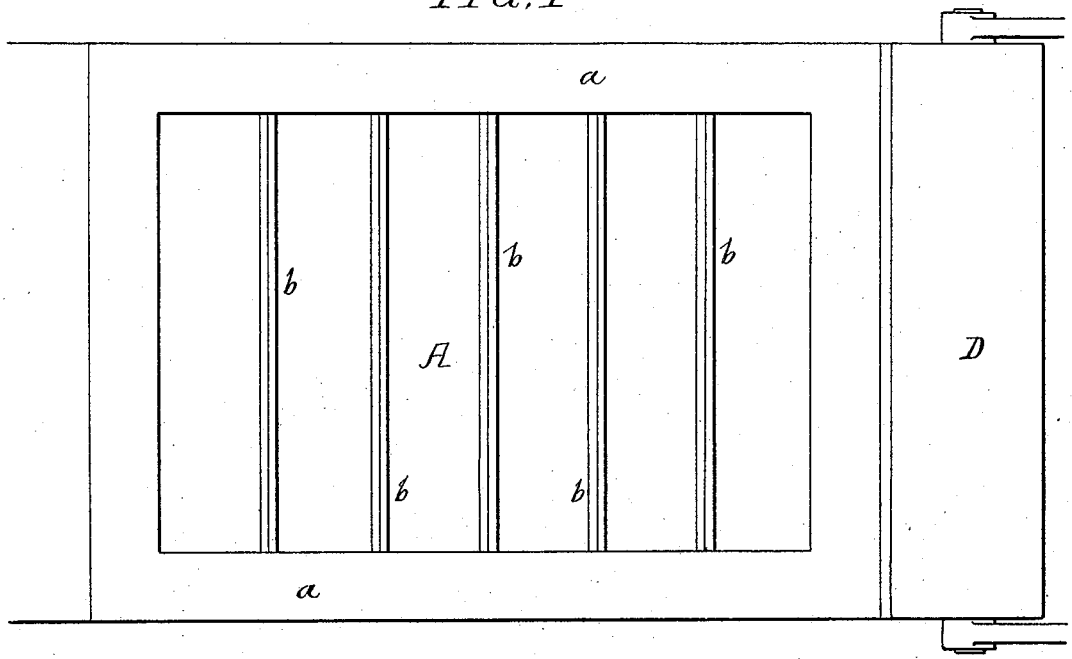
Figure 2:
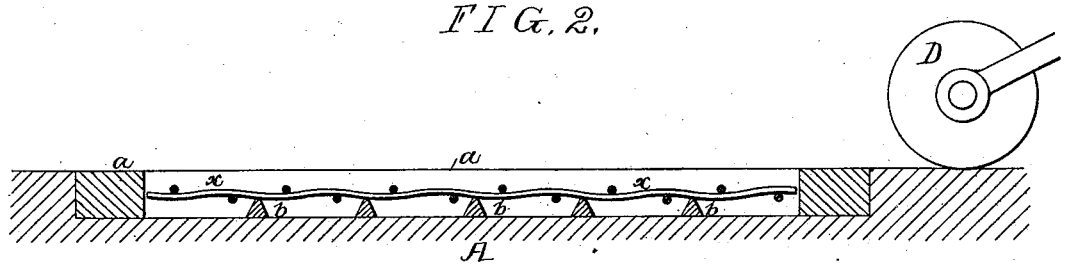
Figure 3:
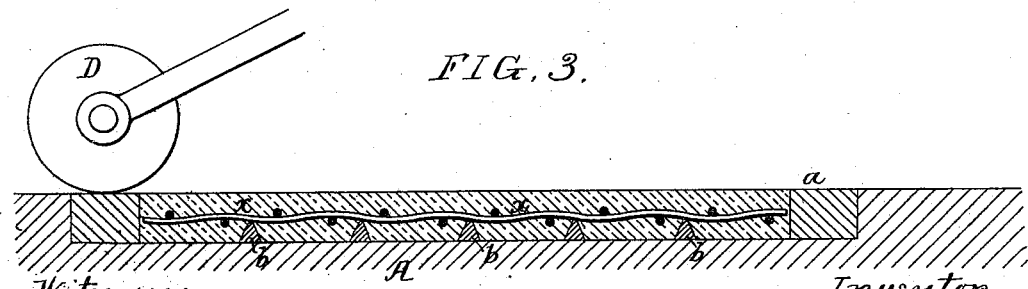

In the accompanying drawings, Figure 1 is a plan view illustrating my improved apparatus for embedding wire in glass. Fig. 2 is a longitudinal sectional view showing the wire in position. Fig. 3 is a longitudinal sectional view showing the glass with the wire embedded therein.

A is the bed, which is of any suitable size and is preferably heated in the ordinary manner, and *a* is a frame within which the glass is molded.

I have shown a loose frame, but it may form part of the bed without departing from my invention.

Within the frame are arranged supporting bars or ribs *b* for the wire or wire-netting to be embedded, these supporting-bars, as shown in Fig. 1, being arranged at intervals parallel with each other and extending the full length of the inclosure.

While I have shown bars or ribs triangular in cross-section, they may be square, circular, semicircular, or of other shapes without departing from my invention. These bars are loosely arranged within the inclosure in the present instance, and on them rests, as shown in Fig. 2, the wire-netting *x* to be embedded within the glass.

In carrying out the process the frame and bars are mounted on the bed, the wire-netting *x* is placed on the bars, the glass is poured in the frame and onto the wire-netting, and then a presser D, preferably a roller, forces down the glass and spreads it into and through all the interstices of the wire-netting.

The finished sheet of glass before being removed from the mold has, as shown in Fig. 3, the supporting-bars *b* embedded in its under side, but as soon as the glass is removed from the mold the supporting-bars can be readily detached and an article produced with grooves in one side. In some instances, however, the supporting-bars may be left in the grooves in order to give additional strength to the sheet of glass.

I claim as my invention—

1. In an apparatus for embedding wire in glass, the combination of the bed, supports for the wire arranged at intervals on and extending above the face of the bed, the side walls for inclosing the glass extending above the supports for the wire, and a presser adapted to press the glass through the wire interstices and embed the same within the glass, substantially as described.

2. A bed for supporting the wire to be embedded in glass, said bed having detachable supporting ribs or bars arranged to elevate the wire above the face of the bed so that the molten glass when poured onto the bed will pass below the surface of the wire, substantially as described.

3. The combination of the bed, the detachable supports for the wire mounted on said bed, the side walls and a presser, substantially as described.

In testimony whereof I have signed my name to this specification in the presence of two subscribing witnesses.

FRANK SHUMAN.

Witnesses:
 HENRY HOWSON,
 JOSEPH H. KLEIN.